Patented Feb. 26, 1952

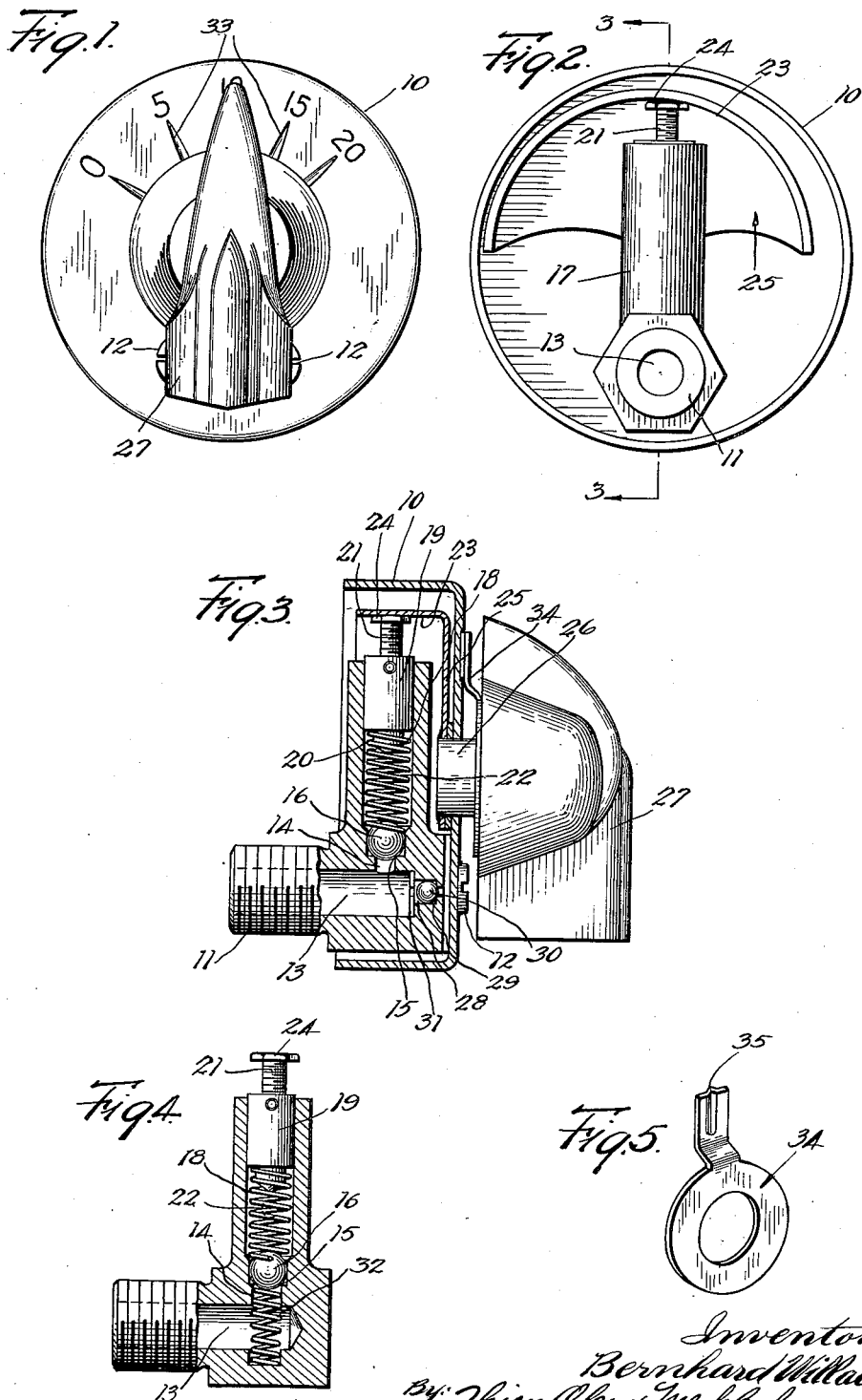

2,587,421

UNITED STATES PATENT OFFICE 2,587,421

RELEASE VALVE

Bernhard Willach, Chicago, Ill., assignor to Jas. P. Marsh Corporation, Chicago, Ill., a corporation of Illinois Application November 14, 1946, Serial No. 709,755

2 Claims. (Cl. 137—53)

1

The present invention relates to a valve and has special reference to a readily set or adjustable release valve for use with pressure systems and apparatus, such, for example, as pressure cookers, to provide for the escape of steam or other fluid under pressure whenever the pressure in the system with which the valve is used is above that for which the valve is set.

More particularly, this invention relates to a release valve in which a pressure opened valve member is biased to closed position by a resilient member, such as a coil spring pressing thereagainst. Externally controlled setting or adjusting means which vary the force exerted by the resilient means against the valve member enable the valve to be set to release the pressure in the system with which it is employed at any desired point within the operating range of the valve. Additional means permit a fine adjustment of the valve to calibrate it or to correct any inaccuracy therein.

The valve is also provided with air inlet means which automatically act to prevent the formation of a vacuum in said system by permitting the entrance of atmospheric air when the pressure within the system is atmospheric or subatmospheric.

The present invention is capable of wide application. One use is in connection with pressure cookers where it may be set for any desired pressure within the operating range and, in conjunction with the proper supply of heat, will maintain such pressure with considerable accuracy, permitting the escape of fluid whenever the pressure for which the device is set is exceeded. As soon as the cooking is completed, or whenever desired, the valve may be set to zero pressure, permitting the escape of all pressure in the cooker without the formation of a vacuum or sub-atmospheric pressures.

An object of the present invention is to provide a release valve having externally controlled means which may be readily set to relieve automatically pressure in excess of that for which it is set.

Another object is to provide such a valve which may be adjusted to correct any inaccuracies therein.

Still another object is to provide a release valve, as above referred to, which will automatically act to prevent formation of a vacuum.

2

A still further object is to provide such a release valve of relatively simple construction capable of wide use in connection with pressure systems.

Further objects and advantages will be apparent from the following description and claims, together with the accompanying drawings, in which latter:

Fig. 1 is a front elevational view of a valve embodying the present invention;

Fig. 2 is a rear elevational view of the valve shown in Fig. 1;

Fig. 3 is a cross-sectional view taken on the line 3—3 in Fig. 2;

Fig. 4 is a cross-sectional view similar to Fig. 3 showing another type of means for preventing the formation of a vacuum, and Fig. 5 is a perspective view of a stamped spring used in the valve.

Referring more particularly to the drawings, there is shown a release valve embodying the present invention comprising a case 10 secured to a post or fitting 11 by means of screws 12. The fitting 11 is provided with external threads so that it may be screwed into a tapped opening provided therefor in the pressure system with which the valve is to be used. As used herein, the phrase "pressure system" is intended to cover various types of pressure systems and also apparatus, such, for example, as pressure cookers.

The post 11 has a central fluid pressure passageway 13 for communication with a pressure system. A vent 14 is provided in the wall of the fitting 11 to permit the escape of fluid pressure from the fitting under certain circumstances. The portion of the fitting surrounding the vent 14 constitutes a valve seat 15 on which a ball 16 seats. A tubular post 17 extends outwardly from the fitting 11 about the vent 14 and valve seat 15. Adjacent the valve seat the central opening in the post 17 is of a size to slidably receive the ball 16, and therebeyond is of greater diameter to permit free passage of the steam when the ball is lifted off its seat.

Positioned outwardly of the ball 16 in the post 17 is a coil spring 18, held in place by a spring follower or abutment member 19. Abutment member 19 is preferably piston shaped for reciprocating movement in the post 17, with the inner end provided with a shaped portion 20 for fitting into the outer end of the coil spring. The outer or opposite end of the abutment member 19 has an adjustable extension 21 threaded therein and capable of being retracted into the abutment member or extended outwardly therefrom, the purpose of which will be hereafter pointed out.

It may readily be seen that pressure in the passageway 13 tends to lift the ball 16 from its seat 15, thereby permitting fluid under pressure to escape from the passageway 13 through the vent 14 into the post 17, from which it may reach the atmosphere through a port 22. As the spring 18 tends to urge the ball 16 to a closed or seated position, movement of the spring follower or abutment member 19 toward the ball will increase the force of the spring thereagainst and require a greater pressure in the passageway 13 to lift the ball 16 from its seat. On the other hand, moving the abutment member 19 away from the ball decreases the force exerted by the spring and permits the ball to be moved to open position by a lower pressure in the passageway 13.

Means are provided which permit external control of the abutment member 19 and thereby of the entire valve. This control means comprises a preferably arcuate or curved cam surface 23 arranged to engage the outer enlarged end 24 of the extension 21. In the particular embodiment illustrated, the cam surface is shown as being substantially semi-circular with the concave side contacting the extension 21. The cam surface 23 is carried by a cam 25 mounted for rotation about the axis of a central shaft 26, with the cam offset with respect to the shaft 26 and the axis of the abutment member 19 as illustrated in Fig. 2. Rotation of the cam 25 and the cam surface 23 will cause movement of the spring follower 19 in the post 17. Looking at the front of the device, clockwise movement of the cam will force the abutment member 19 into the post 17 toward the valve member 16 while counterclockwise movement of the cam permits the spring to move the abutment member 19 outwardly away from the ball 16. To facilitate movement of the cam, a handle 27 is secured to the shaft 26 upon which the cam 25 is fixedly mounted outwardly of the casing 10.

One end of the handle 27 is shaped to form a pointer for cooperating with the markings or dial formed on the front of the casing 10. As shown in Fig. 1, the face of the casing is marked off in increments of five pounds from 0 to 20, preferably by elongated indentations or notches 33 extending radially of the shaft 26. Positioned about the shaft 26 between the handle 27 and the casing front 10 is a stamped spring 34 having a radially extending indentation 35 for engaging the dial notches 33. The spring 34 is fixed to the handle with the indentation 35 aligned with the pointer end of the handle. To set the valve, the pointer is directed toward the mark or position indicating the maximum pressure desired and the valve will thereafter open whenever such pressure is exceeded. The spring 34 being urged against the casing front 10 serves to maintain the handle 27 in any position to which it is moved whether over the dial notches 33 or not.

For originally calibrating the valve or correcting it if it should become inaccurate, the extension 21 is retracted into or extended outwardly from the follower 19, thus respectively decreasing or increasing the force exerted by the spring 18 without changing any other elements of the construction.

Referring to Fig. 3, a construction for preventing formation of a vacuum is disclosed. This consists of a passageway 28 connecting the passageway 13 with the outside atmosphere. The outer end of the passageway 28 is reduced to form a valve seat 29, and a ball 30 positioned in the passageway 28 acts to prevent the entrance of any air when it is seated on the seat 12. The ball 30 is retained in the passageway 28 by a split washer 31. When there is pressure in the passageway 13 the ball 30 will be held in closed position. However, when the pressure in the passageway 13 is sub-atmospheric, the ball 30 will be moved away from its seat 29, thereby permitting the entrance of atmospheric air into the passageway 13 through the passageway 28 and the split washer 31.

In Fig. 4 another construction is shown which acts to prevent the formation of a vacuum in the passageway 13. This construction includes a spring 32 positioned to urge the ball 16 outwardly away from its seat 15. The force exerted by the spring 32 is slightly greater than that exerted by the spring 18 when the valve is set for zero pressure. Consequently, when the handle 27 is set for zero, the spring 32 will maintain the ball 16 in open position, thereby permitting the entrance of atmospheric air through the port 22, post 17, and vent 14.

In describing the present invention a particular type of cam means 25 has been described. This is for the purposes of illustration and not limitation, as other means may be employed which may be actuated externally of the gauge and will serve to move or permit movement of the abutment member 19, thereby altering the setting of the valve. It is also to be understood that various other changes and modifications may be made in the invention without departing from the spirit thereof and therefore I wish to be limited only by the prior art and the appended claims.

I claim:

1. In a release valve having a fluid pressure passageway and a vent therefor, a valve member for closing said vent movable to open position by fluid pressure in said passageway and a spring for exerting force against said valve tending to maintain it in closed position, adjusting means comprising an abutment member associated with said spring for varying the force exerted by said spring upon movement of said abutment member, a rotatable cam member having a concave arcuate cam surface cooperating with said abutment member, said cam surface being eccentrically arranged to move said abutment member upon rotation of said cam member, and a contact member for engaging said cam surface adjustably mounted in said abutment member for adjusting the position of said abutment member independently of movement of said cam member.

2. In a release valve having a fluid pressure passageway and a vent therefor, a valve member for closing said vent movable to open position by fluid pressure in said passageway, a spring housing extending outwardly from said vent, a spring positioned in said housing for exerting force against said valve member tending to maintain it in closed position, and a dished casing in which said valve elements are positioned, adjusting means comprising an abutment member movably mounted in said spring housing cooperating with said spring for varying the force exerted by said spring upon movement of said abutment member, a rotatable cam member positioned in said casing having a concave arcuate cam surface cooperating with said abutment member, said cam surface being eccentrically arranged to vary the pressure of the spring against said valve member upon rotation of said cam member, and a contact member for engaging said cam surface adjustably mounted in said abutment member for adjusting the position of said abutment member independently of the movement of said cam member.

BERNHARD WILLACH.

REFERENCES CITED

The following references are of record in the file of this patent:

UNITED STATES PATENTS

| Number | Name | Date |
|---|---|---|
| 249,718 | Woerle | Nov. 15, 1881 |
| 954,898 | Stenberg | Apr. 12, 1914 |
| 1,087,890 | Rogers | Feb. 17, 1914 |
| 1,150,831 | Benes | Aug. 17, 1915 |
| 1,650,150 | Nelson | Nov. 22, 1927 |
| 1,773,268 | Jenkins | Aug. 19, 1930 |
| 1,798,536 | Hofmann | Mar. 31, 1931 |
| 1,840,968 | Miller | Jan. 12, 1932 |
| 1,860,497 | Eble | May 31, 1932 |
| 1,885,338 | Estep | Nov. 1, 1932 |
| 1,941,023 | Smith | Dec. 26, 1933 |